United States Patent
Nakamura et al.

[11] Patent Number: 5,952,764
[45] Date of Patent: Sep. 14, 1999

[54] CAGE ROTOR HAVING REINFORCING MEMBERS THAT PREVENT DEFORMATION OF END RINGS AT MODERATELY HIGH ROTATION SPEEDS

[75] Inventors: Kosei Nakamura; Yohei Arimatsu, both of Oshino-mura, Japan

[73] Assignee: Fanuc, Ltd., Yamanashi, Japan

[21] Appl. No.: 08/793,843

[22] PCT Filed: Jul. 15, 1996

[86] PCT No.: PCT/JP96/01969

§ 371 Date: Mar. 10, 1997

§ 102(e) Date: Mar. 10, 1997

[87] PCT Pub. No.: WO97/03490

PCT Pub. Date: Jan. 30, 1997

[30] Foreign Application Priority Data

Jul. 13, 1995 [JP] Japan ............................. 7-177429

[51] Int. Cl.⁶ .................................................. H02K 1/22
[52] U.S. Cl. .................. 310/261; 310/262; 310/270; 310/271; 310/211
[58] Field of Search ................................ 310/261, 262, 310/270, 271

[56] References Cited

U.S. PATENT DOCUMENTS

| | | | |
|---|---|---|---|
| 1,823,337 | 9/1931 | Sheely | 310/261 |
| 4,217,515 | 8/1980 | Long et al. | 310/270 |
| 4,309,635 | 1/1982 | Sei et al. | 310/211 |
| 4,885,494 | 12/1989 | Higashi | 310/211 |
| 4,910,423 | 3/1990 | Werber | 310/77 |
| 5,444,319 | 8/1995 | Nakamura et al. | 310/211 |
| 5,473,213 | 12/1995 | Kahle, Sr. | 310/270 |
| 5,508,577 | 4/1996 | Shiga et al. | 310/201 |

FOREIGN PATENT DOCUMENTS

| | | | |
|---|---|---|---|
| 27 21 211 | 11/1978 | Germany. | |
| 60-86073 | 6/1985 | Japan | 310/270 |
| 62-071459 | 4/1987 | Japan. | |
| 6-105511 | 4/1994 | Japan | 310/270 |
| 232 999 | 6/1944 | Switzerland. | |
| 921 669 | 3/1963 | United Kingdom. | |

*Primary Examiner*—Elvin G. Enad
*Attorney, Agent, or Firm*—Staas & Halsey

[57] ABSTRACT

In a cage rotor for an induction motor, a end ring (22) for connecting conductive rods (20) to one another is covered with a reinforcing member (24). The reinforcing member (24) is obtained by integrally forming a tube-like portion (26) having an inner diameter which is substantially equal to the diameter of a central through hole (14) of a laminated core (26), an annular end wall (28) extending radially outward from one end of the tube-like portion (26) in an axial direction, and an annular engagement wall (30) extending radially outward from the other end of the tube-like portion (26) in the axial direction.

2 Claims, 6 Drawing Sheets

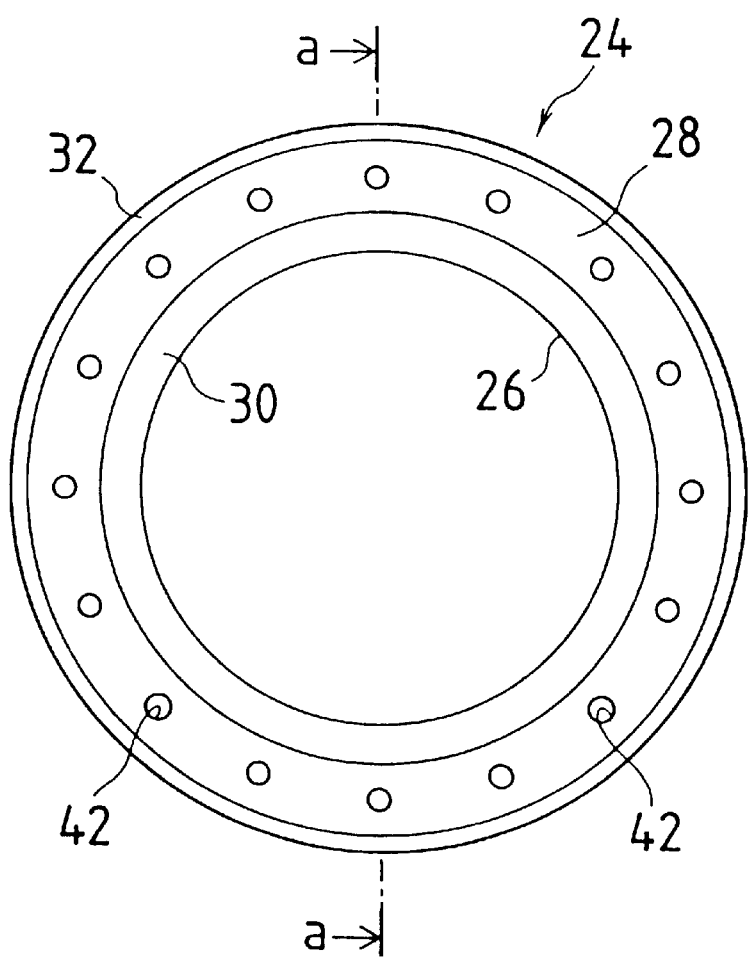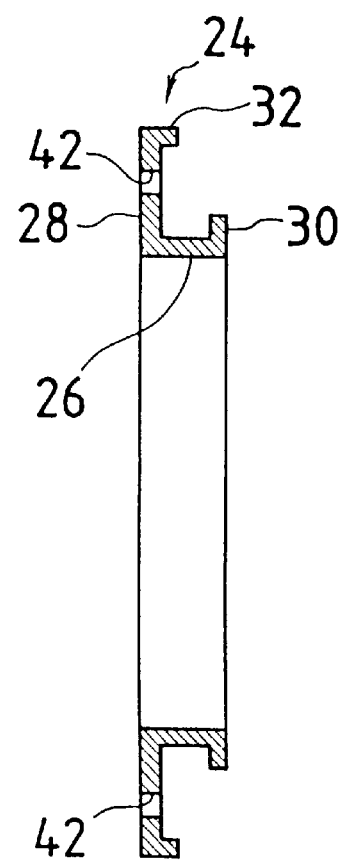

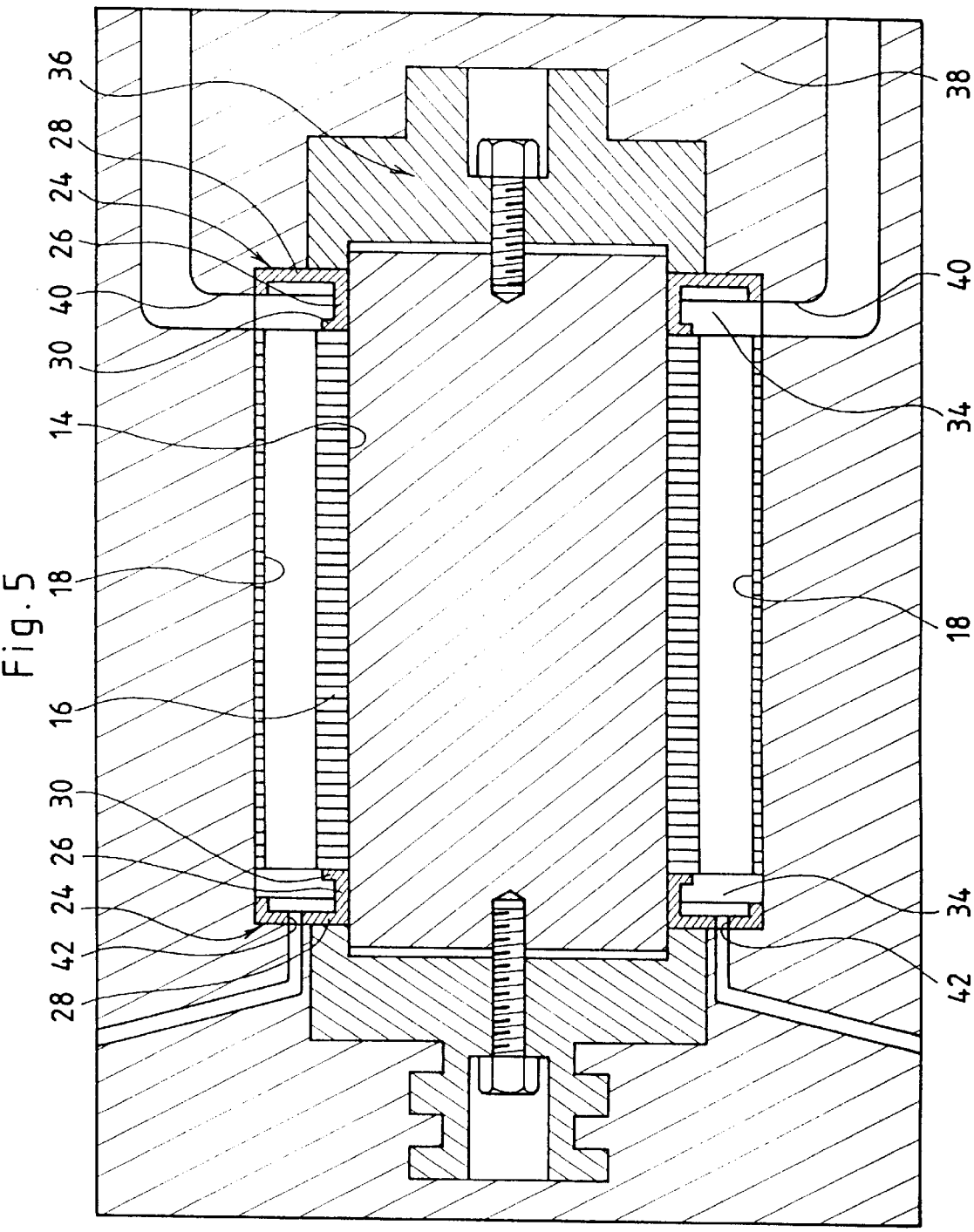

CAGE ROTOR HAVING REINFORCING MEMBERS THAT PREVENT DEFORMATION OF END RINGS AT MODERATELY HIGH ROTATION SPEEDS

BACKGROUND OF THE INVENTION

1. Field of the Invention

The present invention relates to a cage rotor of an induction motor comprising a reinforcing member for preventing an end ring from being deformed at high-speed rotation.

2. Description of the Related Art

In recent years, especially in the field of machine tools, in order to improve the machining ability of a machine, the high-speed operation and high output of a spindle motor for driving a main spindle has progressed. Some induction motors generally used as spindle motors have a cage rotor which is formed by integrally molding by a casting process a plurality of conductive rods to be arranged in a plurality of through holes formed on laminated cores near their outer peripheries and extending in its axial direction and conductive portions comprising a pair of end rings to connect the conductive rods to each other at both the axial ends of the laminated cores. The increase in the operating speed of such an induction motor with such a cage rotor can cause the end rings to be distorted or broken due to the centrifugal force during high-speed rotation.

To deal with this problem, as prior art, separately formed reinforcing members which were made from high-rigidity material such as iron or stainless steel are fixedly mounted on a cage in a manner such that it surrounds the end rings so that the deformation of the end rings may be prevented. In this case, the term "deformation" of the end ring means a state where shape or condition of an end ring is temporarily or permanently changed due to elastic deformation, plastic deformation, breakdown, rupture, or the like.

As an end ring reinforcing member for a high-speed cage rotor, known is an annular element having a virtually L-shaped section which comprises a cylindrical wall portion for covering the outer peripheral surface of the cylindrical portion of the end ring and an annular end wall portion for covering the outer surface of the end ring. According to this reinforcing member, deformation (deformation in a radial direction) of the end ring caused by centrifugal force is prevented by its cylindrical wall portion. However, since the distal end of the cylindrical wall portion is a free end although the proximal end is coupled to the outer periphery of the end wall portion, the cylindrical wall portion itself is distorted outward in the radial direction when the shaft is rotated at a high speed, with the result that the cylindrical wall portion cannot support the end ring any longer.

As means for solving the above problem, a cage rotor comprising an end ring reinforcing member constituted of an annular element having a U-shaped section with an open in one direction (its opening side faces the rotating shaft side) is disclosed, in Japanese Unexamined Patent Publication No. 6-105511. This cage rotor will be described below with reference to FIG. 6A and FIG. 6B which is a sectional view along a line 2—2 in FIG. 6A. This reinforcing member 122 integrally comprises a cylindrical portion 126 for covering the outer peripheral surface of an end ring 120, an end wall portion 130 extending inward from one edge of the cylindrical portion 126 in the radial direction to cover the outer end face of the end ring 120 in the axial direction, and a multi-holed wall portion 128 extending inward from the other edge of the cylindrical portion 126 in the radial direction and interposed between a laminated core 114 and the end ring 120.

A plurality of holes 132 are formed in the multi-holed wall portion 128 corresponding to a plurality of holes 116 of the laminated core 114 through which conductive rods 118 pass. With the reinforcing member 122 arranged at both ends of the laminated core 114 in the axial direction so that the holes 116 of the laminated core 114 and the holes 132 of the multi-holed wall portion 128 are aligned, the conductive rods 118 and the end ring 120 are integrally molded by a casting process. In this manner, each reinforcing member 122 is fixedly connected to the laminated core 114 and the end ring 120.

According to such an arrangement, since both the ends of the cylindrical portion 126 of the reinforcing member 122 are supported through the end wall portion 130 and the multi-holed wall portion 128, the reinforcing member 122 itself is not deformed even during an extremely high-speed rotation such as several tens of thousands revolutions per minute. The ring 120 can thus be prevented from being deformed by centrifugal force.

The reinforcing member 122 for a cage rotor disclosed in Japanese Unexamined Patent Publication No. 6-105511 is formed into the above shape from a round rod of iron, stainless steel, or the like by mechanical process such as cutting or grinding. In this case, an annular blank made of a rod is bored along its internal wall of the center hole so that an annular recess which opens toward the inner peripheral wall is formed. In this manner, an integrated body having a virtually U-shaped section and comprising the cylindrical portion 126, the end wall portion 130, and the multi-holed wall portion 128. In addition, a plurality of holes 132 are formed in the multi-holed wall portion 128.

In the above shaping process, especially when a high-rigidity metal material such as stainless steel is used, it is hard to maintain a machining accuracy within an allowable range in the machining stage where the annular recess which opens toward the inner peripheral wall of the reinforcing member 122 is bored. Thus, the manufacturing cost of the reinforcing member required to maintain necessary machining accuracy tends to increase. For a cage rotor required to operate at an extremely high speed such as several tens of thousands revolutions per minute (for example, 30,000 rpm or more, although the number varies depending on the outer diameter of the rotor), the reinforcing member such as the reinforcing member 122 is preferred to be used regardless of the cost. However, in a high-speed region (for example, 15,000 rpm to 30,000 rpm, although the number varies depending on the outer diameter of the rotor;) not belonging to an extremely high-speed region, the reinforcing member such as the reinforcing member 122 results in an excessive equipment investment, giving rise to the problem of the increase in cost.

SUMMARY OF THE INVENTION

It is an object of the present invention to provide a cage rotor comprising an end ring reinforcing member which not only can prevent an end ring from being deformed by centrifugal force during high-speed rotation but also can be easily machined in manufacturing high-reliability induction motor at low cost.

In order to achieve the above object, a cage rotor according to the present invention comprises a rotating shaft, a laminated core obtained by accumulating a number of magnetic thin plates fixedly connected to the rotating shaft, a plurality of conductive rods arranged in a plurality of through holes formed in the laminated core, and a pair of end rings, arranged at both the ends of the laminated core in its axial direction for connecting the conductive rods to each other, wherein the end ring has a reinforcing member comprising a tube-like portion having an inner diameter which is almost equal to the diameter of a central through hole of the laminated core, an annular end wall extending radially outward from one end in the axial direction of the tube-like portion, and an annular engagement wall extending radially outward from the other end in the axial direction of the tube-like portion are integrally formed. The tube-like portion constitutes the reinforcing member is interposed between the end rings and the rotating shaft. The annular end wall almost entirely covers the outer end face of the end rings in the axial direction. The annular engagement wall is interposed between the laminated core and the end rings.

Preferably, in the reinforcing member, a tube-like portion extending to a certain extent from the outer periphery toward another reinforcing member in a direction parallel to the axis of the tube-like portion is integrally formed with the annular end wall.

The cage rotor according to the present invention having the above arrangement can comprise an end ring reinforcing member which can prevent the inner peripheral portion of the end ring from being bent radially outward along the shaft due to the effect of the centrifugal force during a high-speed operation. In addition, the end ring reinforcing member can easily be manufactured by machining. Therefore, by using the cage rotor according to the present invention, a high-speed induction motor having a high structural reliability can be manufactured at low cost.

BRIEF DESCRIPTION OF THE DRAWINGS

FIG. 4A is a view showing an end face of a reinforcing member;

FIG. 4B is a side view of the reinforcing member along a line a—a in FIG. 4A;

FIG. 5 is a partial sectional front view showing a manufacturing process of the cage rotor in FIG. 1;

DESCRIPTION OF THE PREFERRED EMBODIMENTS

Figure 1:
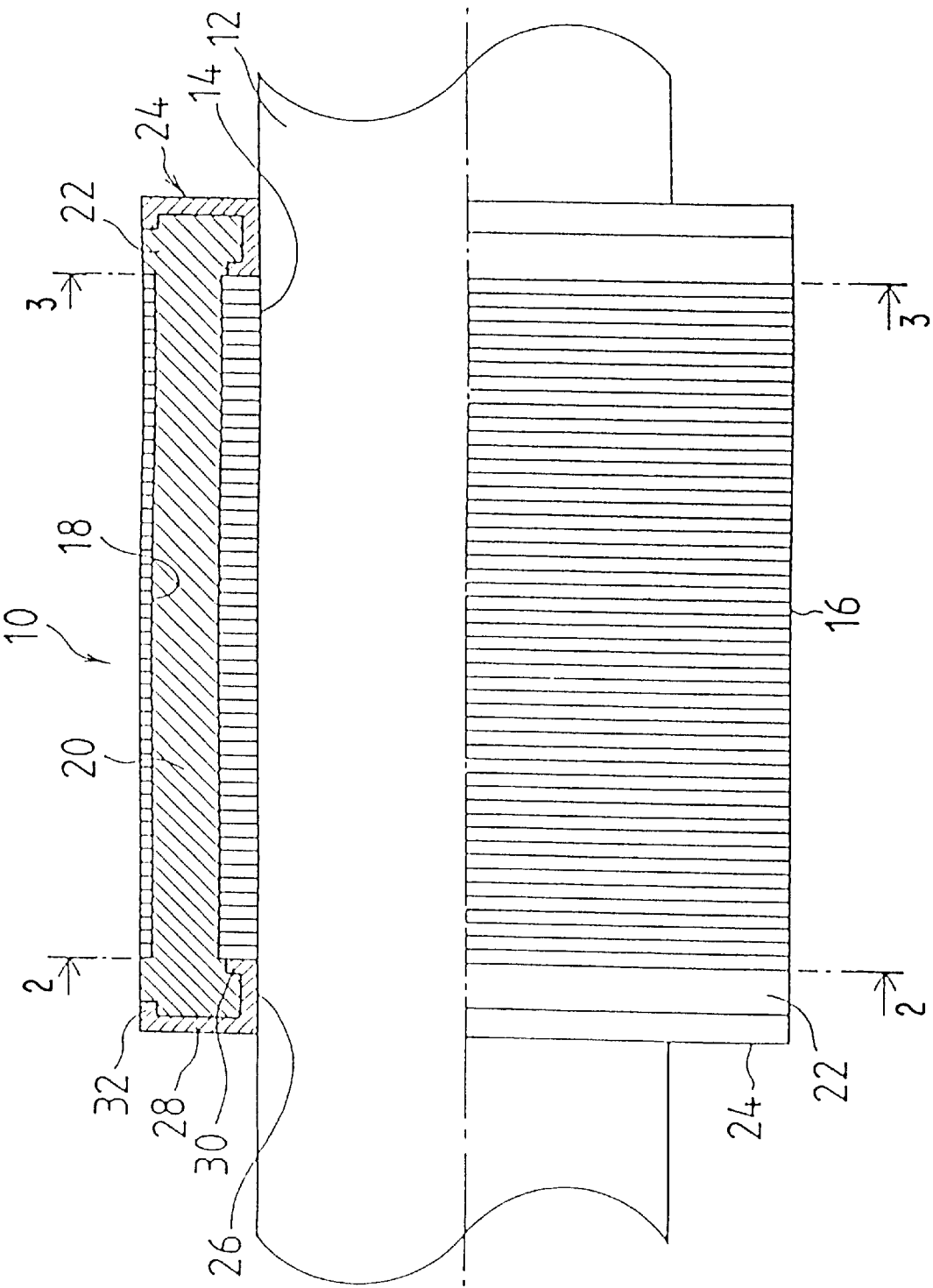
FIG. 1 is a partial sectional front view showing a cage rotor according to the present invention.
Figure 2:
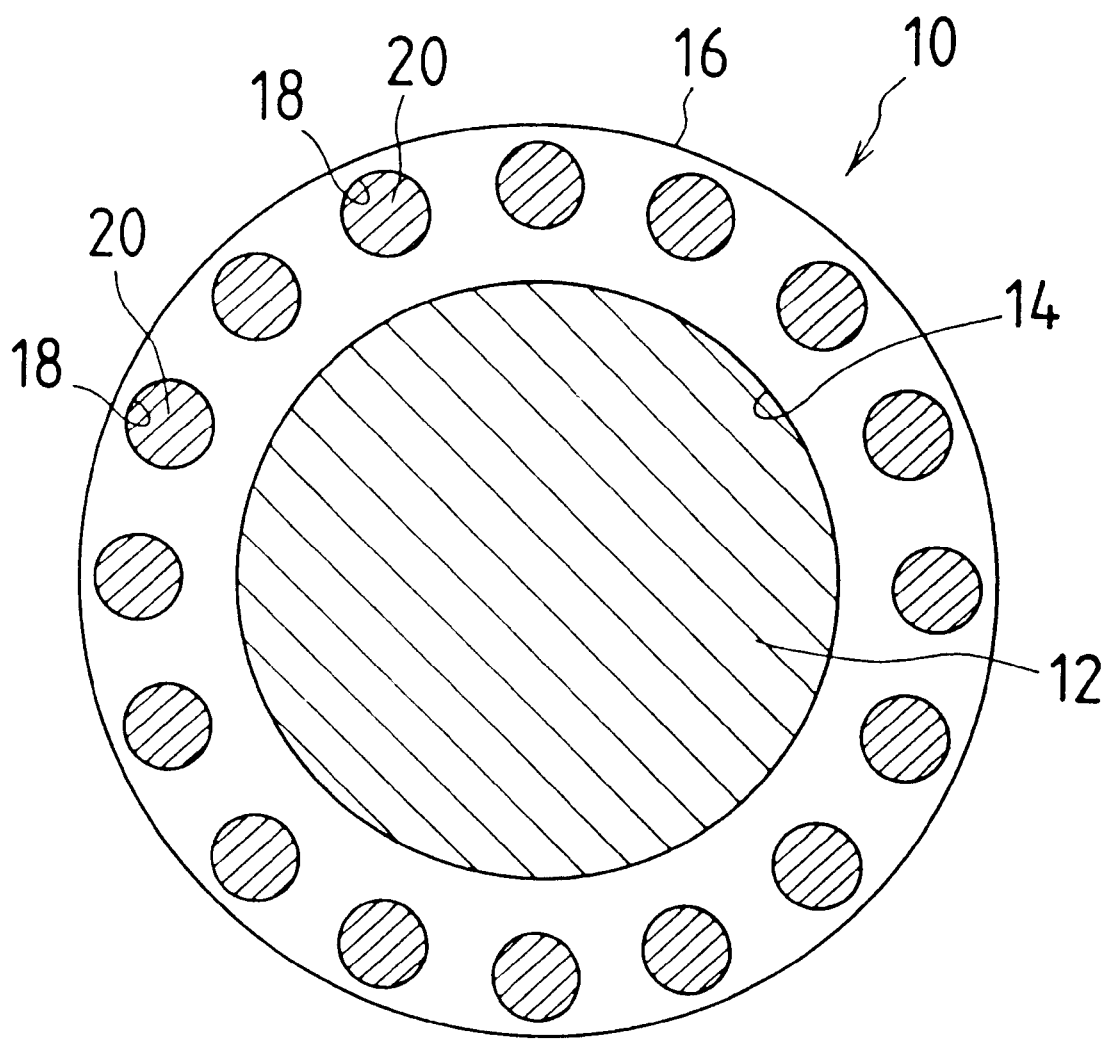
FIG. 2 is a sectional view of the cage rotor along a line 2—2 in FIG. 1.
Figure 3:
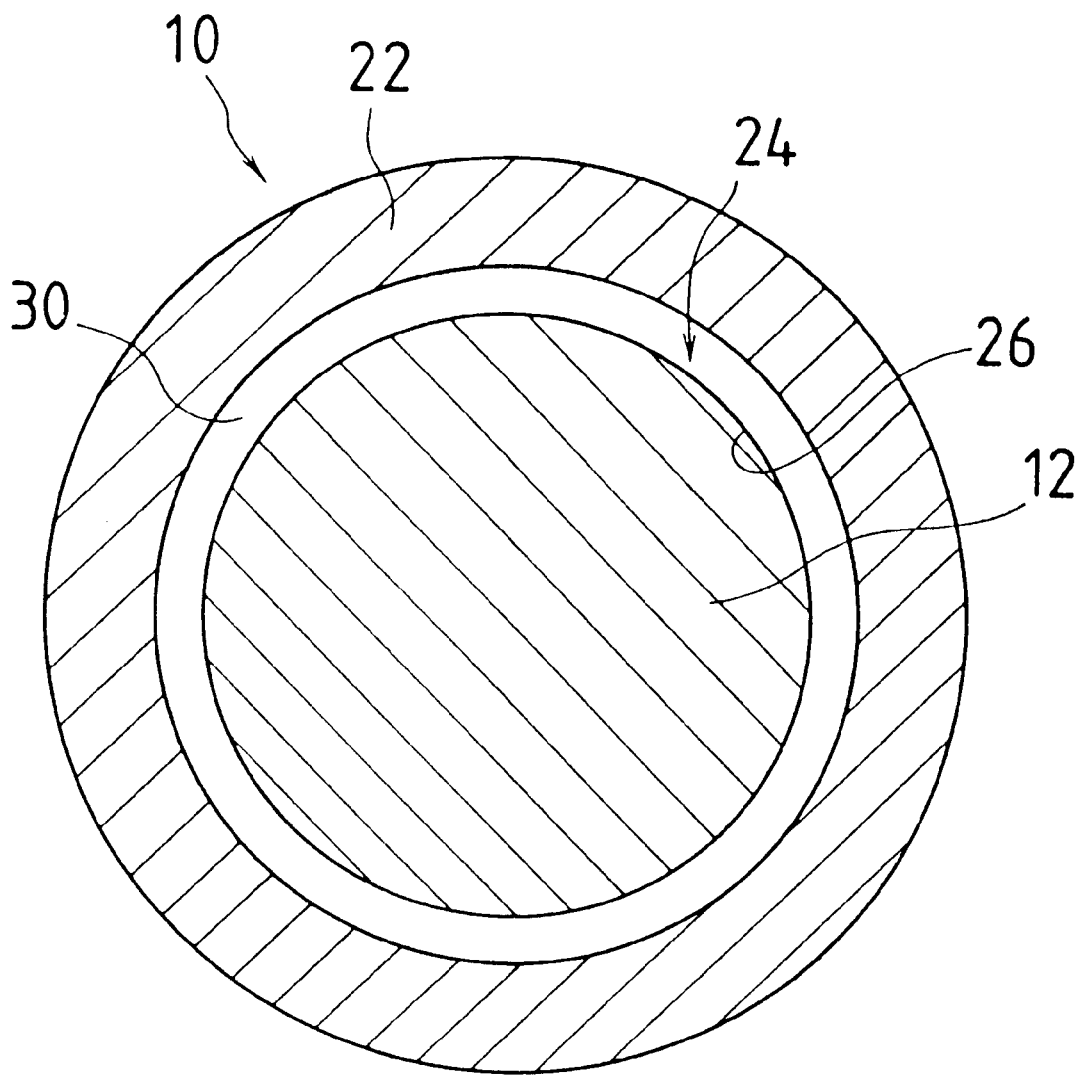
FIG. 3 is a sectional view of the cage rotor along a line 3—3 in FIG. 1.
Figure 6B:
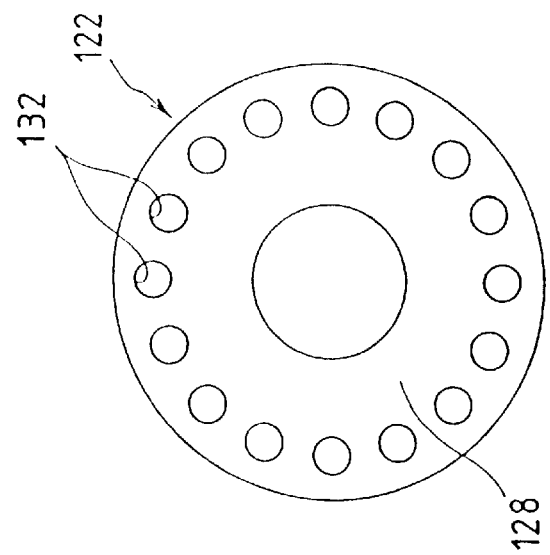
FIG. 6B is a diagram showing an end of reinforcing member along a line 2—2 in FIG. 6A.
Figure 6A:
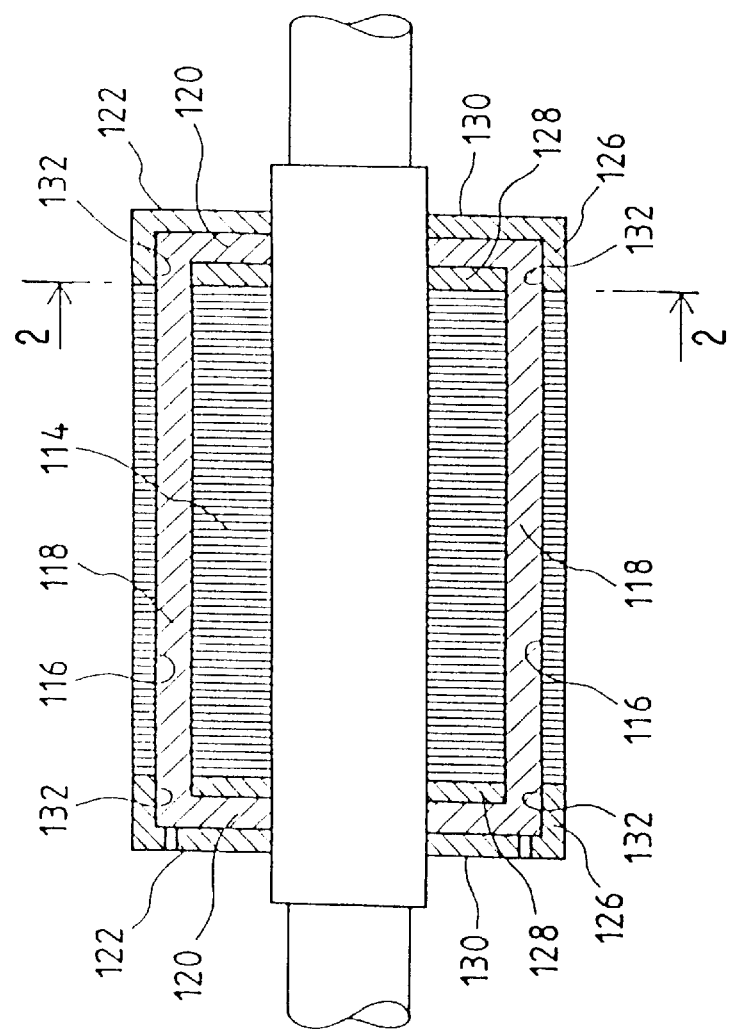
FIG. 6A is a sectional view of a conventional reinforcing member.

A cage rotor according to one embodiment of the present invention will be described below with reference to FIGS. 1 to 3.

A cage rotor 10 comprises a rotating shaft 12, a laminated core 16 fixedly connected to the rotating shaft 12, the laminated core being formed by accumulating a number of magnetic thin plates such as silicon steel plates, a plurality of conductive rods 20 arranged in a plurality of through holes 18 formed in the laminated core 16 in the axial direction, and a pair of end rings 22, arranged at both ends of the laminated core 16 in the axial direction, for connecting the conductive rods 20 to one another.

A central through hole 14 is formed concentrically with the axis of the laminated core 16, and the rotating shaft 12 passes through the central through hole 14. Furthermore, as shown in FIG. 2, a plurality of peripheral through holes 18 are formed in the laminated core 16 extending in its axial direction at equal intervals near the circumference of its outer peripheral portion. The conductive rods 20 are fitted in the through holes 18. One end and the other end of each conductive rod 20 fitted in the corresponding peripheral through hole 18 extend out of the peripheral through hole 18 to be integrally coupled to the ring-like pair of end rings 22. More specifically, a plurality of conductive rods are mechanically and electrically connected to one another through the pair of end rings 22. As will be described later, a plurality of conductive rods 20 and one pair of end rings 22 are integrally molded, thereby forming a conductive portion.

The pair of end rings 22 are arranged opposite to each other interposing the laminated core 16. The end rings 22 in this state has its center coincide with the axis of the central through hole 14 in the laminated core 16.

A plurality of conductive rods 20 and the pair of end rings 22 are integrally formed by a casting process such as a diecasting process using an electrically conductive metal material such as aluminum or copper. Upon completion of molding (casting), the conductive rods 20 are fitted in the peripheral through holes 18 of the laminated core 16, and the laminated core 16 is interposed between the pair of end rings 22.

In order to reduce non-uniform torque of the motor during its operation, the conductive rods 20 may be arranged tilting with respect to the axial line as is commonly known. The sectional shape of the conductive rod 20 (i.e., the sectional shape of the peripheral through hole 18) may take various shapes other than the circular shape (shown in FIG. 2).

The structure of a reinforcing member 24 will be described below with reference to FIGS. 4A and 4B.

The reinforcing member 24 is integrally formed with a tube-like portion 26 having an inner diameter which is substantially equal to the diameter of the central through hole 14 of the laminated core 16, an annular end wall 28 extending from one end in the axial direction of the tube-like portion 26 towards its radially peripheral direction, and an annular engagement wall 30 extending from the other end in the axial direction of the tube-like portion 26 towards its radially peripheral direction. The outer diameter of the annular end wall 28 is substantially equal to the outer diameter of the laminated core 16, and the outer diameter of the annular engagement wall 30 is determined to a size not blocking up a plurality of peripheral through holes 18 formed in the laminated core 16 when the laminated core 16 is interposed between a pair of reinforcing members 24.

The reinforcing member 24 is formed from a high-rigidity material such as stainless steel by applying the machining process such as cutting or grinding. More preferably, a tube-like extended portion 32 extending inwardly in a direction parallel to the axis of the tube-like portion 26 by a certain extent from the outer periphery of the annular end wall 28, and the extended portion 32 is integrally formed with the annular end wall 28.

When the conductive portion, comprising a plurality of conductive rods 20 and the pair of end rings 22, is integrally molded by a casting process (to be described later), the outer peripheral surface of the tube-like portion 26, one of the constituents of the reinforcing member 24 covers the inner peripheral surface of the end rings 22, the annular end wall 28 covers the outer surface of the end rings 22, and the annular engagement wall 30 is interposed between the end face in the axial direction of the laminated core 16 and the end rings 22. Furthermore, the extended portion 32 partially engages with the outer peripheral surface of the end rings 22 (see FIG. 1). When the laminated core 16 is fitted on the rotating shaft 12, the inner peripheral surface of the tube-like portion 26 of each reinforcing member 24 is in contact with the rotating shaft 12. That is, the tube-like portion 26 of the reinforcing member 24 is interposed between the rotating shaft 12 and the end ring 22.

According to the arrangement of the reinforcing member 24, when the conductive portion comprising a plurality of conductive rods 20 and the pair of end rings 22 is formed by casting, each reinforcing member 24 is fixedly supported by the laminated core 16 through the annular engagement wall 30, and is also fixedly supported by the rotating shaft 12 through the tube-like portion 26, particularly, in the radial direction. As a result, the annular end wall 28 of the reinforcing member 24 covers the outer surface of the end rings 22 to prevent the end rings 22 from being deflected by centrifugal force during high-speed rotation, particularly, to prevent the inner peripheral portion of the end ring 22 from lifting by being bent. In this case, the extended portion 32 of the reinforcing member 24 which partially engaged with the outer peripheral surface of the end rings 22 effectively operates to prevent the edge region of the annular end wall 28 from being deflected outward with respect to its axial direction.

The end ring reinforcing function of the reinforcing member 24 can reliably prevent the end ring 22 from being deformed as long as the cage rotor 10 is operated in a high-speed rotation region out of an extremely high-speed region such as that of several tens of thousands of revolutions per minute. In addition, the reinforcing member 24 has an annular form having an L-shaped section which opens radially outward, so that the machining process for forming its tube-like portion 26, the annular end wall 28, and the annular engagement wall 30 can easily be performed by applying a tool from the outer peripheral side of the annular body, thereby contributing to the reduction in manufacturing cost.

A process in manufacturing the cage rotor 10 will be described below with reference to FIG. 5. A plurality of magnetic thin plates which are punched out into the form of a circular disk having openings corresponding to the central through hole 14 and the peripheral through holes 18 are accumulated, and are temporarily fixed to one another by, e.g., caulking, to form the laminated core 16. The reinforcing members 24 are coaxially arranged on the laminated core 16 with their annular engagement walls 30 in contact respectively with the end faces of the laminated core 16. In this case, annular spaces 34 which opens radially outward are formed with both ends of the laminated core 16, both end faces of the laminated core 16 and the tube-like portions 26, the annular end walls 28, and the annular engagement walls 30 of both reinforcing members 24.

As described above, since the outer diameter of the annular engagement wall 30 of the reinforcing member 24 is not so large as to stop a plurality of peripheral through holes 18 of the laminated core 16, the annular engagement wall 30 will not reduce at all the areas of the openings of a plurality of peripheral through holes 18 on both the end faces of the laminated core 16. Therefore, both the annular spaces 34 communicate with a plurality of peripheral through holes 18 of the laminated core 16 assuring smooth circulation of fluid.

In carrying out the casting operation, the reinforcing members 24 are arranged at both ends of the laminated core 16 in the axial direction as described above, and the laminated core 16 and the reinforcing members 24 are integrally supported by a jig 36 when placed in a casting space of a die 38. In this case, one reinforcing member 24 is arranged on the side of a pouring gate 40 of the die 38 to make the annular spaces 34 communicate with the pouring gate 40. In order to stabilize the flow of the molten material during the casting operation, it is preferable for the annular end wall 28 of the other reinforcing member 24 arranged on the side opposing the pouring gate to be provided with small air-bleeding holes 42 which are formed at positions of the annular end wall 28 opposing a plurality of peripheral through holes 18 of the laminated core 16 (see FIG. 4).

When the casting is started, a molten material such as a molten aluminum flows from the pouring gate 40 into the annular spaces 34 under pressure, flows into a plurality of peripheral through holes 18 of the laminated core 16, and then flows into the annular spaces 34 on the side opposing the pouring gate. In this state, the molten material is solidified, and the conductive portion comprising a plurality of conductive rods 20 and the pair of end rings 22 is integrally molded (FIG. 1). The laminated core 16 which is completely cast is removed from the die 38 together with the jig 36, and the jig 36 is removed. In this manner, the laminated core 16 and the pair of reinforcing members 24 which are integrally formed by molding the conductive portions by casting as described above are fixed to the rotating shaft 12 (FIG. 1) by, e.g., shrink fitting, thereby forming the cage rotor 10 (FIG. 1).

What is claimed is:

1. A cage rotor, comprising:

a rotating shaft, a laminated core having first and second ends formed by accumulating a number of magnetic thin plates, fixedly connected to said rotating shaft, a plurality of conductive rods arranged in a plurality of through holes formed in said laminated core, and a pair of end rings, arranged at both ends of said laminated core in the axial direction, for connecting said conductive rods to one another, wherein each of said end rings has a reinforcing member including a tube-like portion having an inner diameter which is substantially equal to the diameter of a central through hole of said laminated core, an annular end wall extending radially outward from one end of the tube-like portion in the axial direction of the tube-like portion, and an annular engagement wall extending radially outward from the other end of said tube-like portion in the axial direction of the tube-like portion, which are integrally formed;

the tube-like portion constituting said reinforcing member is interposed between said end rings and said rotating shaft, the annular end wall substantially covering the outer end face of said end rings in the axial direction, and the annular engagement wall is interposed between said laminated core and said end rings.

2. A cage rotor according to claim 1, wherein said reinforcing member has a tube-like extended portion integrally formed therewith and extending from an external periphery of the annular end wall toward another reinforcing member to a certain extent in a direction parallel to the axis of the tube-like portion.

* * * * *